(12) United States Patent
Zimmer et al.

(10) Patent No.: US 7,310,742 B2
(45) Date of Patent: Dec. 18, 2007

(54) METHOD AND APPARATUS FOR PERFORMING DISK DIAGNOSTICS AND REPAIRS ON REMOTE CLIENTS

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 568 days.

(21) Appl. No.: 10/883,495

(22) Filed: Jun. 30, 2004

(65) Prior Publication Data

US 2006/0005070 A1    Jan. 5, 2006

(51) Int. Cl.
    *G06F 11/00* (2006.01)
(52) U.S. Cl. .............................. 714/5; 714/4
(58) Field of Classification Search ........... 714/5, 714/4, 29, 42, 47; 709/219
    See application file for complete search history.

(56) References Cited

U.S. PATENT DOCUMENTS

| | | | | |
|---|---|---|---|---|
| 6,904,544 | B2* | 6/2005 | DeRolf et al. ................ | 714/43 |
| 2004/0030778 | A1* | 2/2004 | Kronenberg et al. ........ | 709/224 |
| 2004/0103220 | A1* | 5/2004 | Bostick et al. .............. | 709/253 |
| 2005/0076261 | A1* | 4/2005 | Rowan et al. ................ | 714/6 |
| 2005/0099766 | A1* | 5/2005 | Fraley et al. ............... | 361/685 |

OTHER PUBLICATIONS

Quantum Online, "Quantum Smart System", S.M.A.R.T. Advanced Drive Diagnostics White Paper, Jun. 25, 2004, pp. 1-5. www.cocoon-culture.com/lib/noise-report/external-docs/wp_smart_toc.htm.

Hitachi Home, "Drive Fitness Test", Hitachi Global Storage Technologies, Jun. 24, 2004, pp. 1-4. www.hitachigst.com/hdd/technolo/dft.htm.

* cited by examiner

*Primary Examiner*—Dieu-Minh Le
(74) *Attorney, Agent, or Firm*—Blakely, Sokoloff, Taylor & Zafman, LLP (57) ABSTRACT

Method and apparatus for performing disk diagnostics and repairs on remote clients. The method employs an embedded LAN microcontroller at a client to submit diagnostic commands to disk drives hosted by the client. Corresponding diagnostic data is returned from the disk to the LAN microcontroller, and an XML file containing the diagnostic data is generated. The XML file is then packaged as a Simple Object Access Protocol (SOAP) message, which is bound to the Hyper Text Transport Protocol (HTTP), processed via an Internet Protocol (IP) microstack, and sent to a management server via an out-of-band (OOB) communication channel that is transparent to an operating system running on the client. Upon receipt of the SOAP message, the diagnostic data are extracted from the XML file using an XML schema application. A user may request diagnostics be performed for selected disk drives connected to selected client hosts, wherein the request is packaged as an XML file in a SOAP request message. Upon receiving the SOAP request message, the diagnostic commands are extracted from the XML file and submitted to the disk drive.

23 Claims, 7 Drawing Sheets

METHOD AND APPARATUS FOR PERFORMING DISK DIAGNOSTICS AND REPAIRS ON REMOTE CLIENTS

FIELD OF THE INVENTION

The field of invention relates generally to computer systems and, more specifically but not exclusively relates to techniques for performing disk diagnostics and repairs on remote clients.

BACKGROUND INFORMATION

A common component in most computer systems, such as a personal computer (PC), laptop computer, workstation, etc., is a disk drive, also referred to as a hard disk, a hard drive, fixed disk, or magnetic disk drive. Disk drives store data on a set of platters (the disks) that are coated with a magnetic alloy that is sensitive to electrical fields introduced by read/write heads that are scanned over the platters using a precision head actuator. As a platters spin beneath the read/write head at a high rate of speed (e.g., up to 10,000 revolutions per minute), electrical impulses are sent to the read/write head to write data in the form of binary bit streams on the magnetic surface of the platters. Reading is performed in an analogous manner, wherein magnetic field changes are detected in the magnetic platter surface as the platters spin to read back a binary bit stream.

As disk drives get progressively larger in storage capacity, the effect of a failed disk increases somewhat proportionally. For example, a modem disk drive can store 250 or more gigabytes of data—enough storage space for literally 10's of thousands of files, which is generally an order of magnitude more than the storage capacity available just a few years ago. Furthermore, it used to be fairly common to have multiple disk drives for a given PC, due in part to the desire of increasing total platform storage capacity. In most instances, the failure of one of the multiple disks was not as bad as a failure to the only disk drive for the system. However, due to the massive capacity of today's disk drives, there is rarely the need to have multiple disks for a personal workstation, such as a PC.

This leads to a return to the single disk system. Although the mean-time between failure (MTBF) advertised for modern disk drives is very impressive (e.g., 100,000 hours or more), the effective failure rate is significantly higher. This is primarily due to the way the MTBF values are determined. Obviously, the manufacturer wants to present data for its latest product, which means testing of that product can only be performed for a limited amount of time, such as 2000 hours or less (84 days). Thus, if 500 disk drives are tested for 2000 hours each, and one failure results (representing 0.2%), the MTBF is 100,000 hours. In the meantime, a significant percentage of the same drives might fail at 20,000 hours, for example. The point is that disk drives are prone to failure at much lower cumulative hours than indicated by the MTBF values, and failures are unpredictable.

Disk drive original equipment manufacturers (OEMs) have long recognized the potential for disk failures at any point in time. Disk failures, whether actual or perceived, create problems for the OEMs, as well as system integrators, such as Hewlett-Packard, Dell, IBM, etc. First, if a drive actually fails, the customer will usually be very upset (potentially losing 1000's of files and corresponding work product). Second, if the failure is for a drive under warranty, the drive may have to be replaced. Third, replacement of a drive adds costs to both the OEM and the customer.

Perceived failures are also problematic. OEM system manufacturers typically support end users via telephone centers that answer calls, diagnose problems, and instruct end users with corrective actions. One of the biggest challenges in remote support is rapid and correct diagnosis of a problem's root cause so that the right fix can be applied. An end user often describes a symptom (for example, "Windows will not boot") that has many possible causes. Often, end users assume that the hard drive is defective ("so probably my hard drive is broken"). End users have a natural tendency to assume that there is a hard drive defect, because programs and data reside on the hard drive—and many error messages are not easily understandable, such as "data error occurred in user application at 8E000". One OEM estimates 80% of the drives it receives as defective are found to have no defects.

In view of these diagnostic problems, OEMs have developed build-in diagnostic and testing capabilities. One such set of diagnostics, called the S.M.A.R.T. (Self-Monitoring, Analysis and Reporting Technology) system, is built into most modem ATA (Advanced Technology Attachment) and SCSI (Small System Computer Interface) disk drives. S.M.A.R.T. disk drives internally monitor their own health and performance. In many cases, the disk itself provides advance warning that something is wrong, helping to avoid the scenario described above. Most implementations of S.M.A.R.T. also allow users to perform self-tests on the disk and to monitor a number of performance and reliability attributes.

One current approach for accessing built-in diagnostics is via diagnostic user applications. User applications run on operating system kernels and are selectively run by users. Accordingly, the only way diagnostics data can be obtained is if a user runs the diagnostics. Unfortunately, users are not likely to run the diagnostics unless they detect a problem—some types of which may prevent the operating system for loading, and thus preventing the diagnostic user application from being run in the first place. More recently, some operating systems have added the ability to automatically perform some disk drive diagnostic testing during boot-up. However, this does little for computer systems that are infrequently booted and run for days or weeks at a time. Furthermore, the level of detail provided by the operating system (such as "disk failure imminent") is so general or has been shown to be so historically inaccurate that the warnings are often ignored.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of techniques for remotely performing diagnostics and repairs on disk drives are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
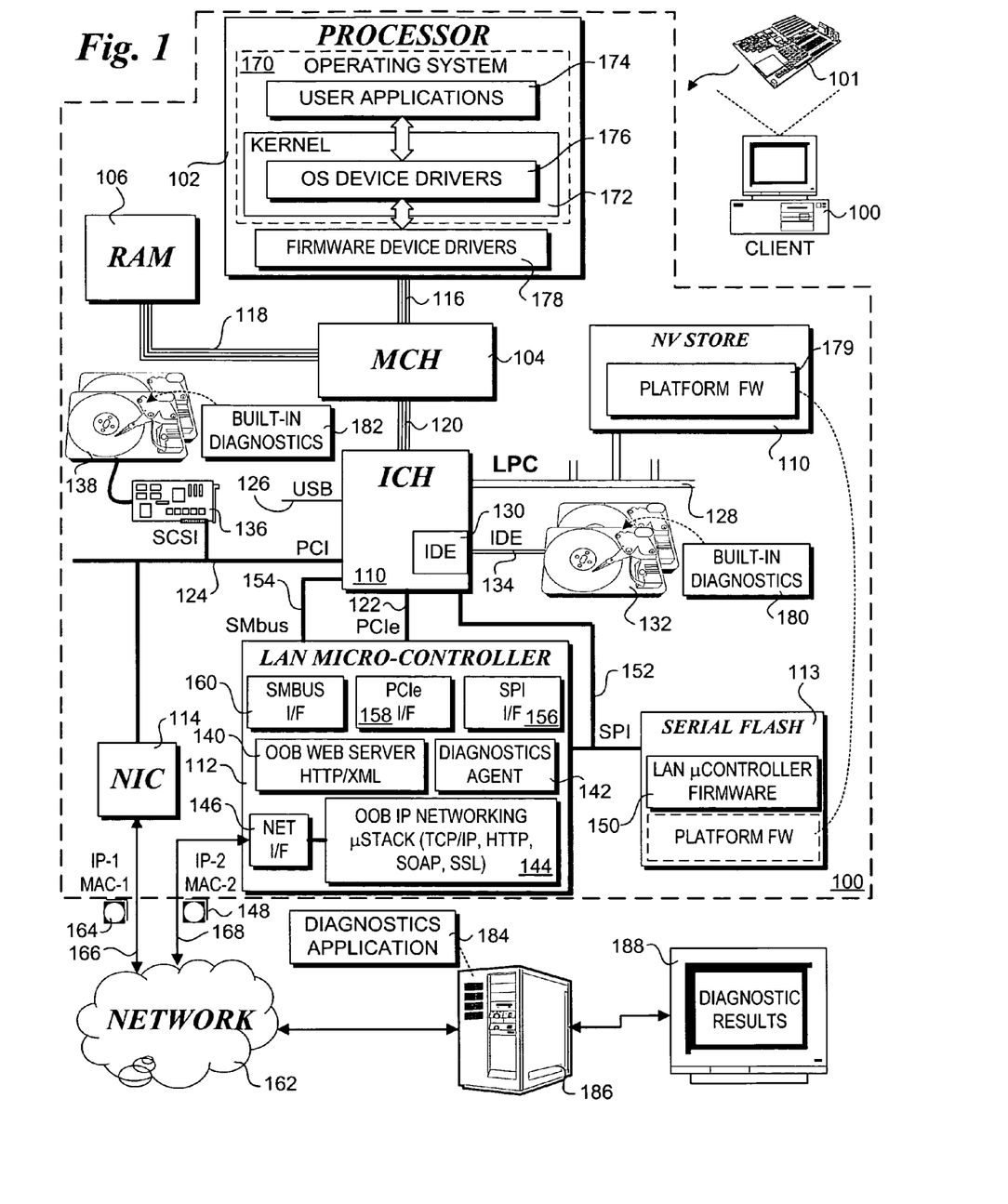
FIG. 1 is a schematic diagram of a computer architecture employed at a client to facilitate remote management of disk diagnostics and repairs, according to one embodiment of the invention.

FIG. 1 shows a system architecture 100 that may be used to implement client-side aspects of the remote disk diagnostics and repair embodiments discussed herein. The architecture includes various integrated circuit components mounted on motherboard or main system board 101. The illustrated components include a processor 102, a memory controller hub (MCH) 104, random access memory (RAM) 106, an input/output (I/O) controller hub (ICH) 108, a non-volatile (NV) store 110, a local area network (LAN) microcontroller (µC) 112, a serial flash chip 113, and a network interface controller 114. Processor 102 is coupled to MCH 104 via a bus 116, while MCH 104 is coupled to RAM 106 via a memory bus 118 and to ICH 108 via an I/O bus 120.

In the illustrated embodiment, ICH 108 is coupled to LAN microcontroller 112 via a peripheral component interconnect (PCI) Express (PCIe) serial interconnect 122 and to NIC 114 via a PCI bus 124. The ICH may is also be connected to various I/O devices via corresponding interfaces and/or ports. These include a universal serial bus (USB) port 126, and a low pin count (LPC) bus 128. In one embodiment, firmware store 110 is connected to ICH 120 via LPC bus 128.

In the illustrated embodiment, ICH 108 further includes an embedded integrated drive electronics (IDE) controller 130, which, in turn, is used to control one or more ATA IDE (or Enhanced IDE-EIDE) disk drives 132 that are connected to the controller via an IDE interface 134. IDE controllers and IDE disk drives are the most common type of disk drive and controller found in modern PCs and laptop computers. Generally, in addition to the configuration shown, a separate (from ICH 108) IDE controller may be provided for controlling an IDE disk drive.

In some embodiments, a SCSI controller is used in place of or in addition to IDE controller 130. In general, the SCSI controller may be a build-in controller or coupled to an expansion bus as an add-on peripheral card, such as a SCSI controller PCI card 136 coupled to PCI bus 124. The SCSI controller is used to drive one or more SCSI disk drives 138. In general, SCSI disk drive 138 is illustrative of various types of SCSI drives, including but not limited to SCSI-1, SCSI-2, SCSI-3 and ultra-SCSI drives.

LAN microcontroller 112 is configured to perform various operations that are facilitated via corresponding functional blocks. These include an out-of-band (OOB) Web Server 140, a diagnostics agent 142, and an OOB Internet Protocol (IP) networking microstack 144. The OOB Web server 140 and OOB IP networking microstack 140 supports IP networking operations that enable external devices to communicate with LAN micro-controller 112 via a conventional Ethernet connection using Web services facilitated via XML (Extended markup language) sent via HTTP (Hypertext transport protocol). Accordingly, LAN micro-controller 112 also provides a LAN µC network interface 144 that is connected to a platform Ethernet port 146.

Figure 10:
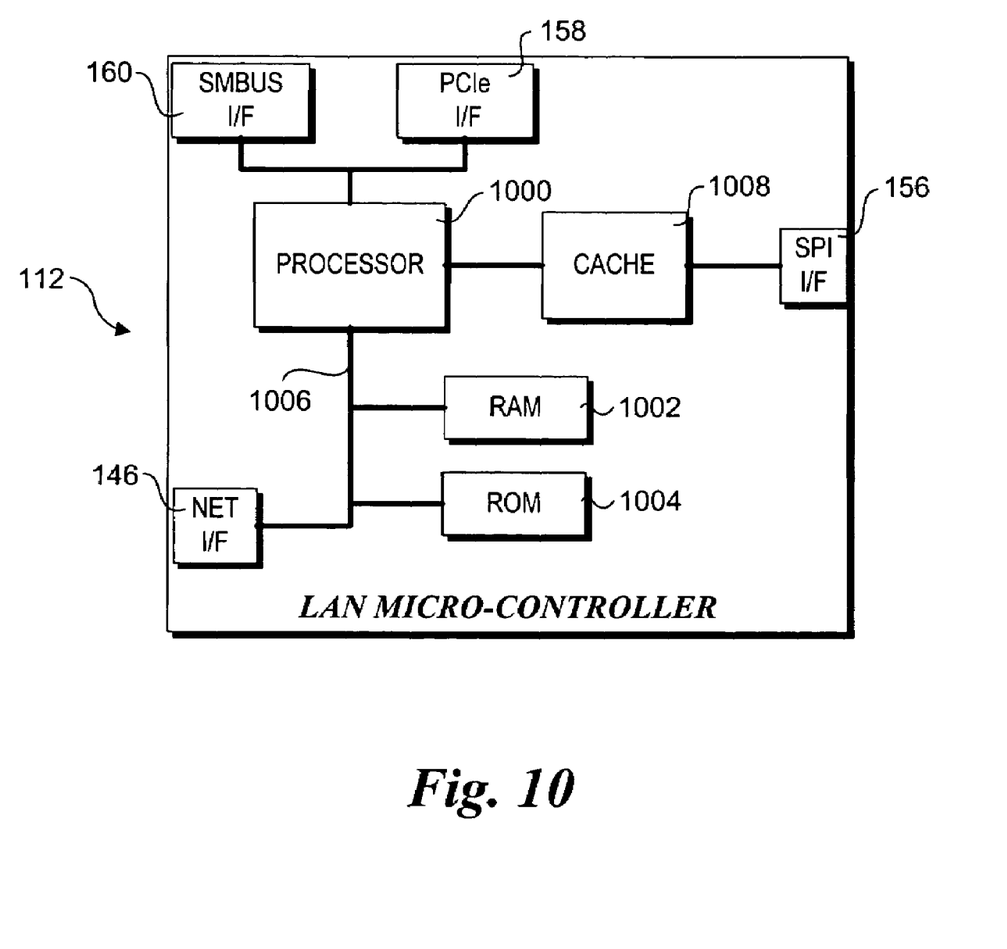
FIG. 10 is a schematic block diagram illustrating components of a LAN microcontroller used in the architectures of FIGS. 1 and 2, according to one embodiment of the invention.

To effectuate the operation of its various functional blocks, LAN microcontroller 112 loads firmware 150 from serial flash chip 113 and executes the firmware instructions on its built-in processor. (Details of the LAN microcontroller hardware architecture are shown in FIG. 10 and discussed below.) In one embodiment, the transfer of data from serial flash chip 113 to LAN microcontroller 112 is sent over a Serial Peripheral Interface (SPI) 152. In one embodiment, LAN microcontroller 112 is also coupled to ICH 110 via SPI 152 in addition to PCIe interconnect 122. Furthermore, in one embodiment LAN microcontroller 112 is coupled to ICH 110 via a system management SM bus 154. Communications via SPI 152 are facilitated by an SPI interface (I/F) 156, while communications via PCIe interconnect 122 are facilitated by a PCIe interface 158, and communications via SMbus 154 are facilitated by an SMbus interface 160.

Under conventional usages, the client is enabled to connect to a computer network 162 via a platform NIC Ethernet port 164, which is internally connected to NIC 114. To facilitate concurrent and separate usage, each of platform NIC Ethernet port 164 and LAN µC Ethernet port 148 have respective media access control (MAC) addresses and respective IP addresses. For simplicity, the respective MAC addresses are depicted as MAC-1 and MAC-2, while the respective IP addresses are depicted as IP-1 and IP-2. In general, NIC Ethernet port 164 and LAN µC Ethernet port 148 support respective network links 166 and 168 to network 162 using conventional LAN operations and protocols.

Processor 102 is shown running an operating system 170 including an OS kernel 172. The operating system hosts various user applications 174 running in the OS's user space. The OS kernel includes various OS device drivers 176. The OS device drivers are used to support communication with corresponding hardware devices and peripherals, such as IDE drives 132 and SCSI drives 136. Typically, corresponding firmware device drivers 178 comprising a portion of platform firmware 179 are employed in a firmware layer to support "low-level" device functions, while providing abstracted interfaces to corresponding OS device drivers.

As further shown in FIG. 1, each of IDE drives 132 and SCSI drives 138 run respective sets of built-in diagnostics 180 and 182. In one embodiment, either or both of built-in diagnostics support the aforementioned S.M.A.R.T. functionality. Built-in diagnostics 180 and 182 are also representative of existing and future disk diagnostics operations.

Under the conventional approach discussed above, the built-in diagnostics for a disk drive are implemented in the following fashion. A user application 174 comprising a diagnostics program is loaded into operating system 170, and the user selects to perform one or more diagnostic operations. The user application that passes disk drive access request to an OS disk device driver included with OS device drivers 176. This OS-level disk drive access request is translated into appropriate low-level commands by a corresponding firmware disk device driver included with firmware device drivers 178. The low-level commands are then passed to IDE controller 130 or SCSI controller card 136 (in accordance with the disk drive being accessed and the platform configuration) via MCH 104 and ICH 110 (and PCI bus 124 for SCSI controller card 136), and the drive controller issues appropriate commands to have the disk drive perform selected or complete diagnostic functions, or retrieve existing diagnostic data stored on-board the disk drive. The results of those functions are then returned to the user application, traversing the aforementioned routes in the reverse direction.

Under embodiments of the invention, the conventional technique is bypassed. Rather, the process is initiated by a diagnostics application 184 running on a remote management server 186 that is connected to network 162. The diagnostics application issues one or more diagnostic request commands to client 100 using an out-of-band communication channel facilitated by LAN microcontroller 112. The terminology "out-of-band" refers to a condition where the operating system running on client 100 is unaware of the existence of the OOB communication channel or any of its functions. In fact, OOB communications between client 100 and remote management server 186 may occur concurrently with in-band network communications that are sent to various computers and servers coupled to network 162 via network link 166. Such in-band communications are managed and controlled by operating system 174.

Upon receipt of the request via the OOB communication channel, the request is processed by OOB IP networking microstack 144. This process is explained in further detail below. An extracted message is passed to diagnostics agent 142, which then opens a communication channel to one of IDE controller 130 or SCSI controller card 136 via one of SPI 152, PCIe interconnect 122 or Smbus 154. The communication channel further includes PCI bus 124 for communications with SCSI controller card 136. Diagnostic commands similar to those discussed for the conventional approach are transferred to the appropriate disk controller via the communication channel. In response, corresponding diagnostics are performed via built-in diagnostics 180 or 182, and the results of those diagnostics are returned to diagnostics agent 136. The diagnostics engine then returns the results to remote management server 186 via OOB IP networking microstack 144 and network link 168. Upon receiving the results at remote management server 186, they are returned to diagnostics application 184 and displayed on a monitor 188.

Figure 2:
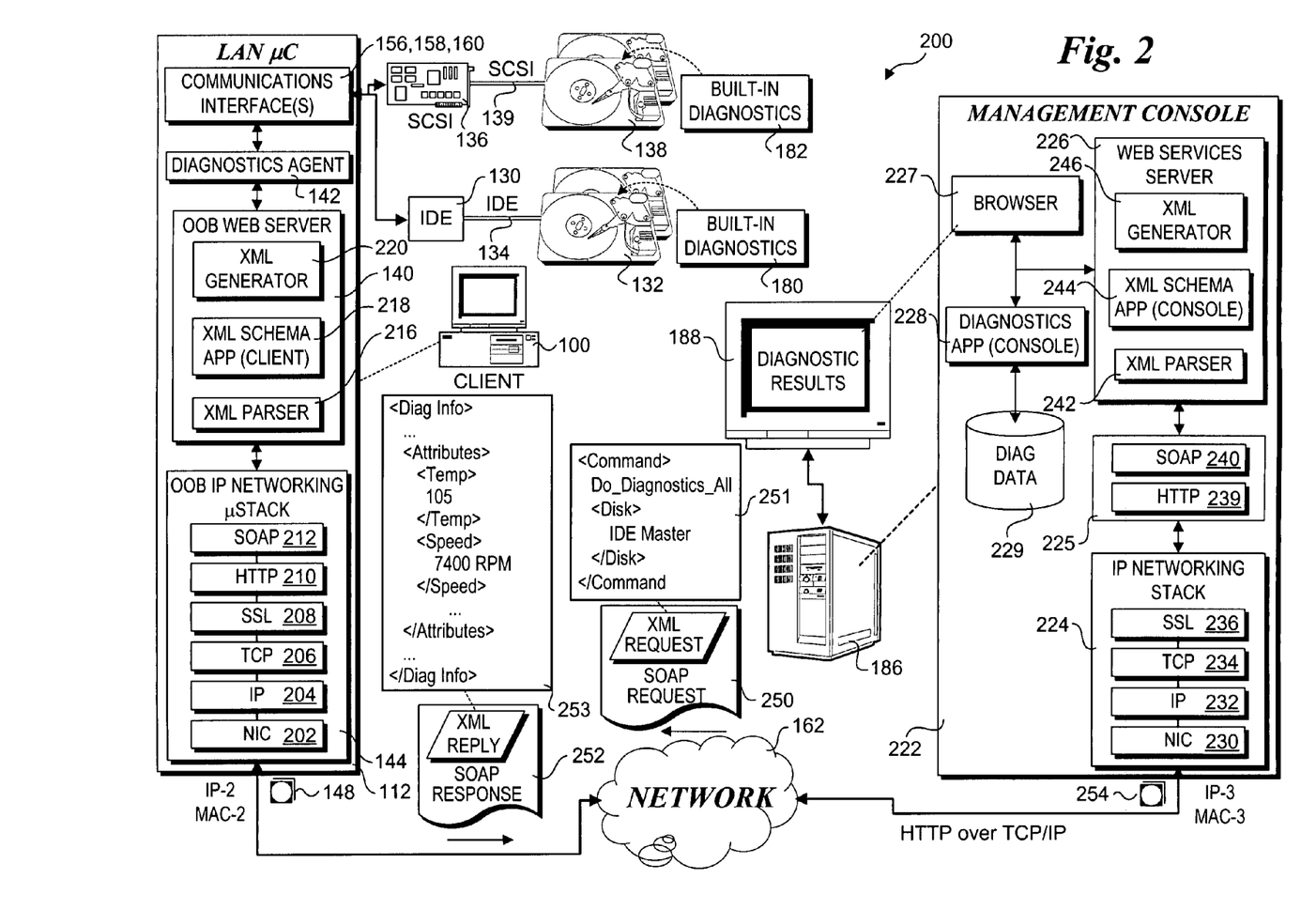
FIG. 2 is a schematic diagram of a firmware and software architecture to support remote management of disk diagnostics and repairs using the client computer architecture of FIG. 1, according to one embodiment of the invention.

FIG. 2 shows a system architecture 200 illustrating further details of programmed hardware, firmware, and software components used to facilitate remote disk diagnostics operations between client 100 and management server 186, according to one embodiment. The illustrated components for LAN microcontroller or logically divided into four components or component sets. These include OOB IP networking microstack 144, OOB Web server 140, diagnostic agent 142, and communication interfaces 156 (SPI), 158 (PCIe) and 160 (SMBus). OOB IP networking microstack includes multiple stacked layers that are used to facilitate network communication. These include NIC layer 202, an Internet Protocol (IP) layer 204, a TCP (transport control protocol) layer 206, a secure socket layer (SSL) layer 208, an HTTP layer 210, and a SOAP (Simple Object Access Protocol) layer 212. The OOB Web server 140 includes an XML parser 216 a client XML application schema 220, and an XML generator 220.

Management server 186 is used to host a management console 222 via which a user (e.g., system administrator) can selectively request disk diagnostic operations to be preformed on the disk drives of remote clients (e.g., client 100) and/or request retrieval of data from previous diagnostics operations that are internally stored on-board the disk drives. These components include an IP networking stack 224, a SOAP/HTTP block 225, a Web services server 226, a browser 227, and a console diagnostics application 228. Also depicted within management console 222 is a diagnostic data store 229, which is used to store diagnostics data retrieved from the disk drives of various clients.

IP networking stack 224 comprises a NIC layer 230, an EP layer 232, a TCP layer 236, and an SSL layer 236. In one embodiment, the IP networking stack components are provided as part of the TCP/IP drivers for an operating system.

SOAP/HTTP block 226, which includes an HTTP component 238 and a SOAP component 240 is used for packaging XML files (documents) into SOAP messages and binding the messages to HTTP as an HTTP POST or an HTTP GET request. SOAP is a communication protocol used for communication between applications over a network. It is based on XML, and is platform and language independent.

Traditionally, remote applications (e.g., applications running on different computers connected via a network) communicate using Remote Procedure Calls (RPC) between objects like DCOM and CORBA. However, HTTP, the transport used for Internet traffic, was not designed for this. RPC represents a compatibility and security problem; as such, firewalls and proxy servers will normally block RPC traffic. SOAP was developed to support RPC-like functionality using HTTP, which is supported by all Internet browsers and servers. SOAP 1.1 was originally proposed to the World Wide Web Consortium (W3C) organization in May, 2000, and a working draft was first published in December, 2001.

The Web services server 226 is used to facilitate generation and processing of XML-based web services messages. Its components are similar to OOB Web server 140, and include an XML parser 242, and console XML schema application 244, and an XML generator 246

In general, the components depicted for LAN microcontroller 112 comprise firmware-based and/or programmed hardware-based components. However, the LAN microcontroller architecture includes provisions for uploading software components, such as but not limited to diagnostics agent 142. (Thus, diagnostics agent 142 may comprise a software or firmware component). Meanwhile, the components depicted for management server 186 will typically software components that are executed on or are part of an operating system.

As further depicted in FIG. 2, data is transferred between management server 186 and client 100 in the form of SOAP request messages (e.g. SOAP request message 250) including embedded XML requests (in the form the SOAP Body element) (e.g., XML request 251 and SOAP response messages (e.g., SOAP response message 252) including embedded XML replies (e.g., XML reply 253). Each of the XML request and XML replies comprises a hierarchy of XML entries containing embedded objects. During processing at the client and the management server, the objects are extracted from these XML documents using client and server XML schema applications 218 and 244, respectively. In order to better understand this process, a brief discussion of XML processing now follows.

XML, a subset of the Standard Generalized Markup Language (SGML), is the universal format for data on the World Wide Web (WWW). Using XML, users can create customized tags, enabling the definition, transmission, validation, and interpretation of data between applications and between individuals or groups of individuals. XML is a complementary format to HTML (Hypertext Markup Language) and is similar to the HTML, as both contain markup symbols to describe the contents of a page or file. A difference, however, is that HTML is primarily used to specify how the text and graphic images of a Web page are to be displayed or interacted with. XML does not have a specific application but can be designed for a wider variety of applications In accordance with the DOM building operations of blocks 702 and 708 of FIG. 7 (discussed below), an XML document is converted to an object model tree data structure comprising as a document object model (DOM) tree. In general, this operation may be performed using one of many commercially available XML parsers; in one embodiment the XML parsers of FIG. 2 are embodied as a firmware component corresponding to XML parser 216 and a software component corresponding to XML parser 242.

Figure 3:
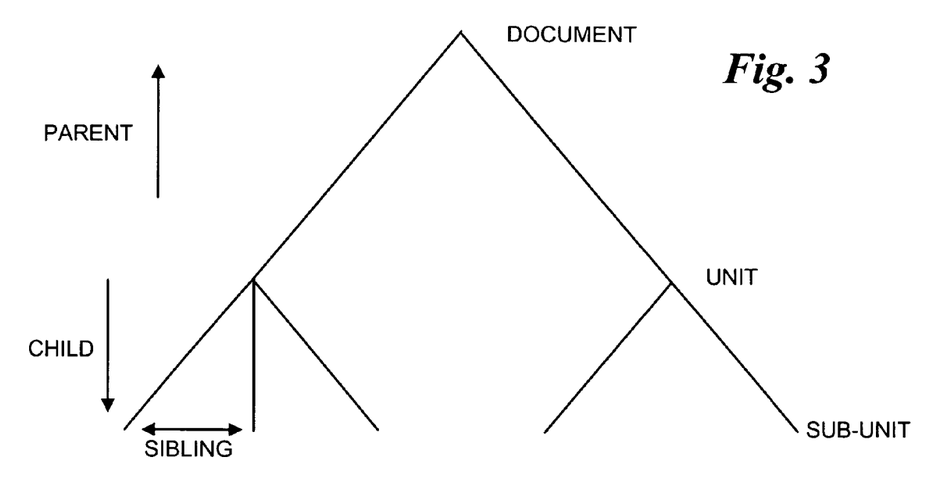
FIG. 3 is a schematic diagram illustrating a pictorial view of a document object model (DOM) tree.
Figure 4:
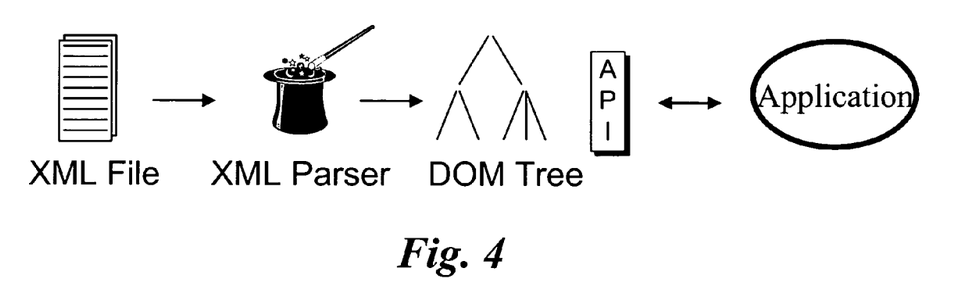
FIG. 4 is a schematic diagram pictorially illustrating processing and interactions between a XML file and an application
Figure 5:
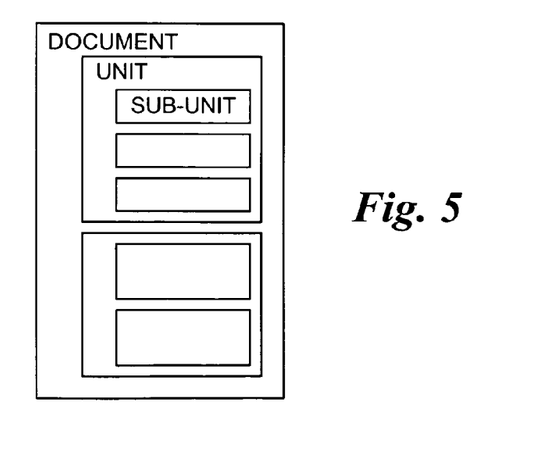
FIG. 5 is a schematic diagram illustrating the logical object hierarchy described by the DOM tree of FIG. 3.

In brief, an object model contains information pertaining to objects, along with properties of those objects. Such information is typically illustrated as a tree-like data structure comprising a plurality of nodes, wherein a parent node may have one or more child nodes, and the lowest level nodes are known as leaf nodes, such as shown in FIG. 3. This parallels the natural hierarchy of well-formed XML documents. As with HTML, XML documents comprise a plurality of XML elements defined by start- and end-tag pairs, wherein each XML element contains all of the data defined between its tags. This data may typically include other XML elements, such that XML elements may be nested within other XML elements. This creates a natural tree-like hierarchy, with parent-child relationships that are similar to those used in object models. For example, FIG. 3 shows an exemplary DOM tree architecture, while the corresponding object model hierarchy is depicted in FIG. 5. FIG. 4 pictorially illustrates operations to provide data contained in an XML document (i.e., file) to an application.

In accordance with the foregoing similarities between XML document structures and object models, the XML parsers 216 and 242 generate a DOM tree by parsing the XML elements, extracting the inherent parent-child relationships and any corresponding data for each node. For example, XML documents typically contain a plurality of XML elements nested a various levels in the document's tree hierarchy, as defined by respective XML element start- and end-tag pairs. An object tree provides a logical representation of the components of a DOM tree that would result from parsing the XML of an XML document. Each object and any associated properties in an object tree representation is derived from a corresponding XML element in an XML listing, wherein the object's position in the object tree structure directly corresponds to the hierarchical position of its corresponding XML element in the XML listing. As will be recognized by those skilled in the XML arts, the actual DOM tree would provide additional information including interfaces that enable methods to manipulate the objects to which the interfaces correspond, as well as other DOM nodes and objects. These components of the DOM tree may or may not be used by the embodiments of the invention described herein, depending on the particularities of the implementation.

According to further aspects of this specification, XML schemas are employed to assist in extracting data objects from XML structures. XML schemas are used to define datatypes and corresponding structures. Schemas are normally thought of in terms of databases. A schema is generally defined as the organization or structure of a database, and is often derived from a data model defining the structure and relationship between data elements. A schema typically comprises a structure using some sort of controlled vocabulary that names items of data, and lists any constraints that may apply (e.g., datatype, legal/illegal values, special formatting, etc.). The relationships between data items (the objects of data models) are also an important part of any schema.

In the context of XML, formal specifications for schemas are defined by the W3C. The three relevant specification documents include three parts: XML Schema Part 0: Partner, XML Schema Part 1: Structures, and XML Schema Part 2: Datatypes. The current versions of these specifications are respectively available at http://www.w3.org/TR/xmlschema-0/, http://www.w3.org/TR/xmlschema-1/, and http://www.w3.org/TR/xmlschema-2/, all dated May 2, 2001.

Figure 6:
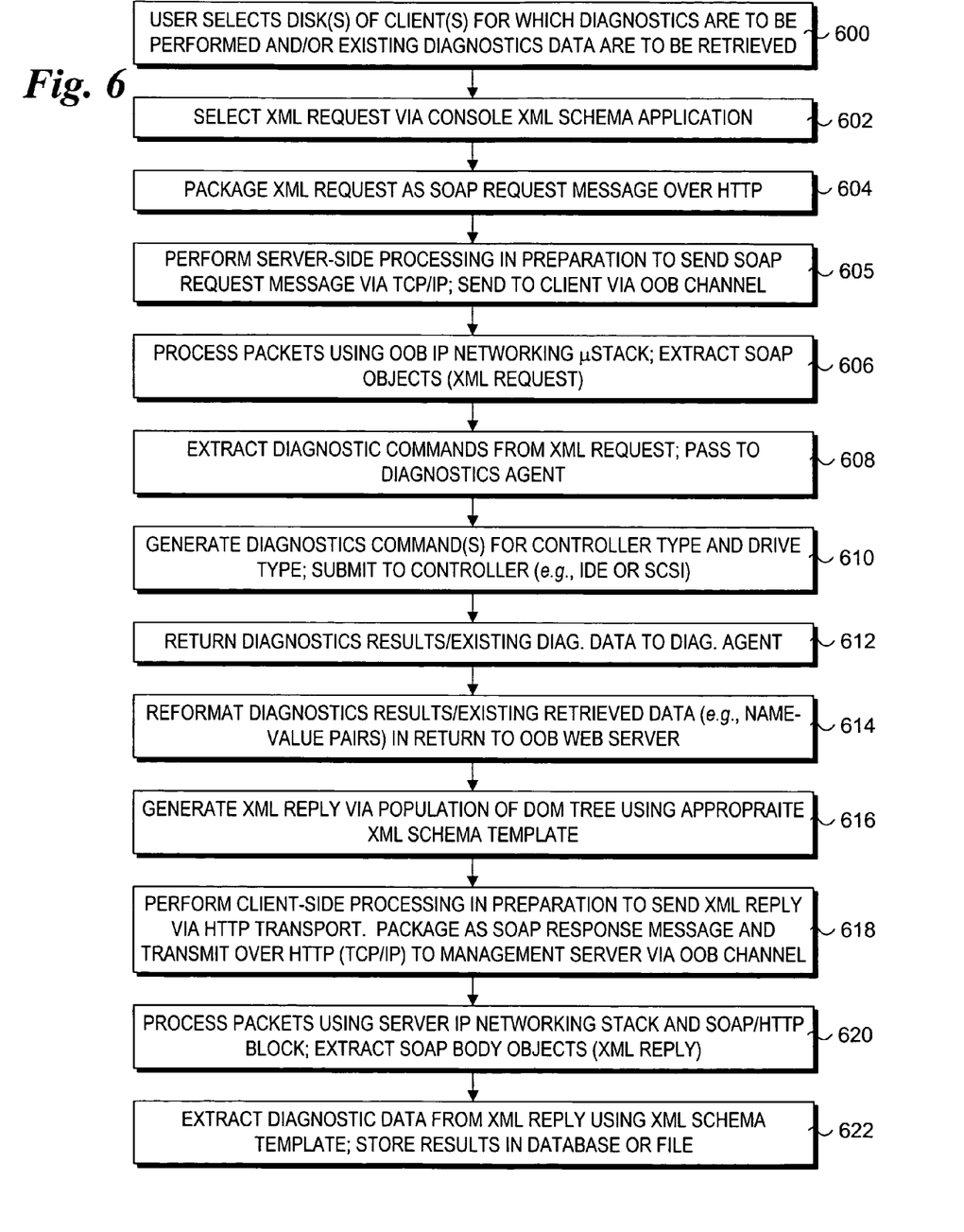
FIG. 6 is a flowchart illustrating operations performed in connection with remotely managing diagnostics operations performed on a client disk or disks under the firmware and software architecture of FIG. 2, according to one embodiment of the invention.

With reference to the flowchart of FIG. 6, a remote client disk diagnostics process, according to one embodiment, begins in a block 600 with a user selection via management console 222 to perform diagnostics on and/or retrieve existing diagnostics data from the disk(s) for a particular client, or multiple clients. In one embodiment, management console 222 is integrated with a resource management application or service that enables the management console to "view" the disk configuration of the various clients coupled to network 162. Such views are supported by operating systems including, but not limited to Microsoft Windows 2000 and 2003 Server, Linux, and UNIX. In one embodiment, the management console user interface comprises a set of Web pages displayed via browser 227.

(The following operations concern the diagnostics processing for a single disk. It will be understood that similar operations would be performed for each disk selected for diagnostics in block 600.)

In response to the user diagnostics request for a particular disk, a corresponding pre-built XML request is selected via XML Schema application 244 in a block 602. For example, the XML request might have a format similar to XML request 251. In general, the XML request will contain information, in XML format, that identifies a particular diagnostic operations or set of diagnostic operations to be performed. In one embodiment, the XML request, as well as other XML files, has a structure compliant with the XML Schema Language, wherein corresponding XML schema templates are stored at both remote management server 186 and client 100. In one embodiment the XML schema is based on the Common Informational Model (CIM) Schema Version 2, Release 7 (CIM 27), as defined by the Distributed Management Task Force, Inc, (DMTF) Portland, Oreg.

Next, in a block 604, the XML query is "packaged" to be transferred to client 100 as a SOAP request message 250 using an HTTP binding. In one embodiment, the transfer of data between management server 186 and client 100 is facilitated by Web Services interfaces using Web Services Description Language (WSDL) and SOAP/XML. In one embodiment, the interface protocols employ the Simple Object Access Protocol (SOAP) v1.1 and relationships among messages are defined by the Web Services Definition Language v1.0. The operations of block 604 are generally performed by SOAP/HTTP block 225.

A SOAP message comprises a conventional XML document containing the following elements:

A required Envelope element that identifies the XML document as a SOAP message;

An optional Header element that contains header information;

A required Body element that contains call and response information; and

An optional Fault element that provides information about errors that occurred while processing the message.

All the elements above are declared in the default namespace for the SOAP envelope: http://www.w3.org/2001/12/soap-envelope and the default namespace for SOAP encoding and data types is: http://www.w3.org/2001/12/soap-encoding.

A skeleton SOAP message appears below in Listing 1.

```
<?xml version="1.0"?>
<soap:Envelope
xmlns:soap="http://www.w3.org/2001/12/soap-envelope"
soap:encodingStyle="http://www.w3.org/2001/12/soap-encoding">
<soap:Header>
    ...
    ...
</soap:Header>
<soap:Body>
    ...
    ...
    <soap:Fault>
        ...
        ...
    </soap:Fault>
</soap:Body>
</soap:Envelope>
```

Listing 1

The required SOAP Envelope element is the root element of a SOAP message, and defines the XML document as a SOAP message. The optional SOAP Header element contains application specific information about the SOAP message. If the Header element is present, it must be the first child element of the Envelope element.

The required SOAP Body element contains the actual SOAP message intended for the ultimate endpoint of the message. Immediate child elements of the SOAP Body element may be namespace-qualified. SOAP defines one element inside the Body element in the default namespace ("http://www.w3.org/2001/12/soap-envelope"). This is the optional SOAP Fault element, which is used to indicate error messages.

A sample SOAP request message that includes a SOAP body containing a request to perform disk diagnostics on an IDE master for a selected target client (XML request 251) appears below in Listing 2, while an exemplary SOAP response message containing disk diagnostic data (XML reply 253) returned in response to the SOAP request message is shown in Listing 3.

```
<?xml version="1.0"?>
<soap:Envelope
xmlns:soap="http://www.w3.org/2001/12/soap-envelope"
soap:encodingStyle="http://www.w3.org/2001/12/soap-encoding">
<soap:Body>
    <Command>
        Do_Diagnostics_All
        <Disk>
            IDE Master
        </Disk>
    </Command>
</soap:Body>
</soap:Envelope>
```

Listing 2

```
<?xml version="1.0"?>
<soap:Envelope
xmlns:soap="http://www.w3.org/2001/12/soap-envelope"
soap:encodingStyle="http://www.w3.org/2001/12/soap-encoding">
<soap:Body>
    <Diag Info>
        ...
        <Attributes>
            <Temp>
                105
            </Temp>
            <Speed>
                7400 RPM
            </Speed>
            ...
        </Attributes>
        ...
    </Diag Into>
</soap:Body>
</soap:Envelope>
```

Listing 3

Returning to a block 605 in FIG. 6, once the SOAP request message is generated and the HTTP binding is performed, the SOAP request message is processed by the networking components in IP networking stack 224 to form one or more network (e.g., TCP/IP) packets in a block 605 using conventional packet processing techniques and transferred over network 162 to client 100. In further detail, the packets are sent out a management server network port 254 using an in-band communication channel (i.e., a communication channel managed by the server's operating system) and received using the OOB channel for LAN microcontroller 112 at network port 148.

Upon receipt at network port 148, the network packets are processed using the components provided by OOB IP networking microstack 144 using conventional packet-processing techniques, as depicted in a block 606. However, in this instance, the microstack components comprise embedded firmware components rather than network device drivers running within an operating system. Further operation in block 606 include extracting the SOAP elements, which yields the original XML request 251.

Next, in a block 608, the diagnostics commands are extracted from the XML request. This is performed by parsing the XML request with XML parser 216 in view of an appropriate schema template corresponding to the request via client XML schema application 218. In brief, the XML request has a specific structure defined by a corresponding XML schema template. The template defines elements as objects, which have fixed names, and corresponding values, which are variables. For example, in the exemplary listing illustrated for XML request 251, the Disk (as defined by the <Disk> . . . </Disk> element) is an object name, and IDE master is the corresponding value. Similarly, the <Command> element is an object named "Command", while Do_Diagnostics_All is the object's value. The parsing of an XML file in view of the appropriate schema produces a set of name-value pairs, which are then passed as request data to diagnostics agent 142.

In response to being provided with the name-value pair data, diagnostic agent 142 generates one or more corresponding diagnostics commands and submits the command to the appropriate drive controller, such as IDE controller 130 or SCSI controller card 136, as depicted in a block 610. The diagnostic commands will generally be configured for the controller and drive type. For example, a given manufacturer may have a set of commands from which diagnostics commands may be issued and/or existing diagnostic data can be returned.

S.M.A.R.T. is based on technology originally developed by IBM (International Business Machines) and Compaq. IBM's reliability prediction technology is called Predictive Failure Analysis (PFA®). PFA measures several attributes, including head flying height, to predict failures. The disc drive, upon sensing degradation of an attribute, such as flying height, sends a notice to the host that a failure may occur. Upon receiving notice, users can take steps to protect their data. Some time later, Compaq announced a breakthrough in diagnostic design called IntelliSafe™. This technology, which was developed in conjunction with Seagate, Quantum, and Conner, monitors a range of attributes and sends attribute and threshold information to host software. The disc drive then decides if an alert is warranted, and sends that message to the system, along with the attribute and threshold information. The attribute and threshold level implementation of IntelliSafe varies with each disc drive vendor, but the interface, and the way in which status is sent to the host, are consistent across all vendors. Compaq placed IntelliSafe in the public domain by presenting their specification for the ATA/IDE environment, SFF-8035, to the Small Form Factor Committee on May 12, 1995. Seagate quickly recognized that reliability prediction technology offered tremendous benefits to customers, and researched the possibility of making a version available to other system OEMs, integrators, and independent software vendors. Seagate was joined by Conner, IBM, Quantum and Western Digital in the development of this new version, appropriately named S.M.A.R.T., which combines conceptual elements of Compaq's IntelliSafe and IBM's PFA.

Features of S.M.A.R.T. technology include a series of attributes, or diagnostics, chosen specifically for each individual drive model. Attribute individualism is important because drive architectures vary from model to model. Attributes and thresholds that detect failure for one model may not be functional for another model. In general, the architecture of the drive will determine which attributes to measure, and which thresholds to employ. Although not all failures will be predicted, we can expect an evolution of S.M.A.R.T., as technology and experience sharpen our ability to predict reliability. Subsequent changes to attributes and thresholds will also occur as field experience allows improvements to the prediction technology.

A disc drive must be able to monitor many elements in order to have a comprehensive reliability management capability. One of the most crucial elements is understanding failures. Failures can be seen from two standpoints: predictable, and unpredictable. Unpredictable failures occur quickly, like electronic and mechanical problems, such as a power surge that can cause chip or circuit failure. Conversely, predictable failures are characterized by degradation of an attribute over time, before the disc drive fails. This creates a situation where attributes can be monitored, making it possible for predictive failure analysis. Many mechanical failures are typically considered predictable, such as the degradation of head flying height, which would indicate a potential head crash. Certain electronic failures may show degradation before failing, but more commonly, mechanical problems are gradual and predictable. Mechanical failures, which are mainly predictable failures, account for approximately 60% of drive failure.

S.M.A.R.T. attributes are reliability prediction parameters, customized by the manufacturer for different types of drives. To determine attributes, design engineers review returned drives, consider the design points, and create attributes to signal the types of failures that they are seeing. Information gained from field experience can be used to predict reliability exposures and, over time, attributes can be incorporated into the new reliability architecture. Though attributes are drive-specific, a variety of typical characteristics can be identified:

head flying height
data throughput performance
spin-up time
re-allocated sector count
seek error rate
seek time performance
spin try recount
drive calibration retry count The attributes listed above illustrate typical kinds of reliability indicators. Ultimately, the disc drive design determines which attributes the manufacturer will choose. Attributes are therefore considered proprietary, since they depend on drive design As discussed above, S.M.A.R.T. emerged for the ATA/IDE environment when SFF-8035 was placed in the public domain. SCSI drives incorporate a different industry standard specification, as defined in the ANSI-SCSI Informational Exception Control (IEC) document X3T10/94-190. The S.M.A.R.T. system technology of attributes and thresholds is similar in ATA/IDE and SCSI environments, but the reporting of information differs.

In an ATA/IDE environment, software on the host interprets the alarm signal from the drive generated by the "report status" command of S.M.A.R.T. The host (e.g., client 100) polls the drive on a regular basis to check the status of this command, and if it signals imminent failure, sends an alarm to the host to be detected by a user or system administrator. This allows downtime to be scheduled by the system administrator to allow for backup of data and replacement of the drive. This structure also allows for future enhancements, which might allow reporting of information other than drive conditions, such as thermal alarms, CD-ROM, tape, or other I/O reporting. The host system can evaluate the attributes and alarms reported, in addition to the "report status" command from the disc.

Generally speaking, SCSI drives with reliability prediction capability only communicate a reliability condition as either good or failing. In a SCSI environment, the failure decision occurs at the disc drive, and the host notifies the user for action. The SCSI specification provides for a sense bit to be flagged if the disc drive determines that a reliability issue exists. The system then alerts the end user/system manager.

In accordance with the architecture of FIG. 1, the diagnostics commands are sent first to ICH 110 using an appropriate communication interface, which will typically depend on the particular architecture for the platform and/or implementation choice. In respective embodiments, the commands are send to ICH 110 via SPI interface 156, PCIe interface 158, and SMbus interface 160.

After the diagnostic tests have been performed (if new tests are to be performed), the results, and/or existing diagnostic data, are returned to diagnostic agent 142 in a block 612 via the same disk controller and communication interface used for sending the diagnostic command to the disk controller. In one embodiment, the results are then matched to corresponding objects to produce name-value pairs. The name value pairs are then returned to OOB web server 220 in a block 614.

In a block 616, an XML reply corresponding to the XML request is generated by population a DOM tree using an appropriate XML schema template. Details of these operations are described below with reference to FIG. 7. In one embodiment, the operations of block 616 are performed by XML generator 220 and client XML schema application 218.

Once generated, in a block 618 the XML reply is package into a SOAP response message and sent to management server 186 via an HTTP transport in a manner analogous to the operations of block 604. In a block 620, the XML reply message is processed at the management server using IP networking stack 224 and SOAP/HTTP block 225 in a manner analogous to the operations discussed above for OOB IP networking microstack 144 in block 608. The diagnostic data are then extracted at Web services server 228 in a block 622 using XML parser 242 and console XML schema application 244, wherein the process is facilitated using an appropriate schema (selected in view of the original XML request, in one embodiment). The extracted data are then returned to console diagnostics application 228, which then formats and stores the data in a database or file, as depicted by diagnostic data store 229. Diagnostics results for selected disk drives may then be retrieved from the data store an displayed via browser 227 on monitor 188.

Figure 7:
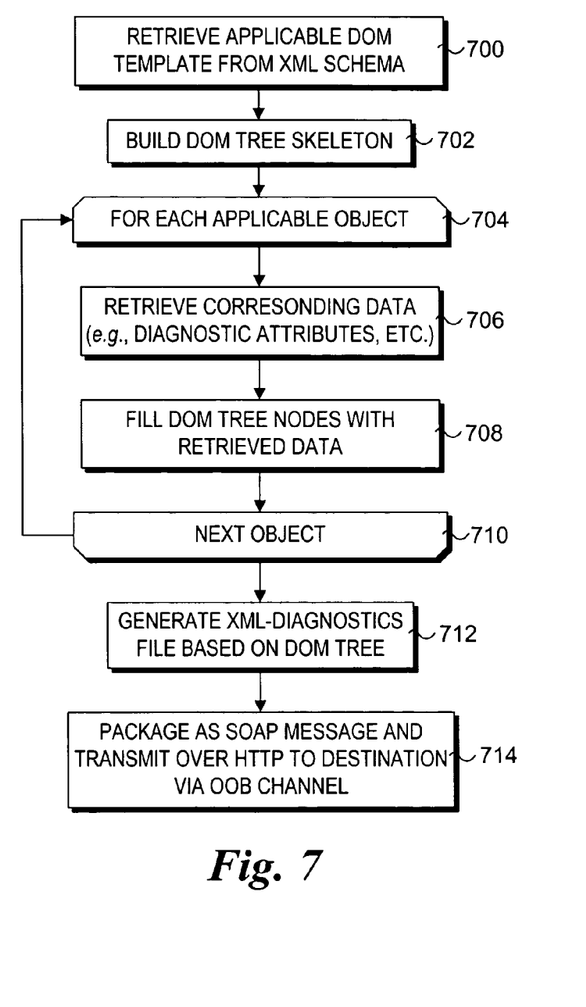
FIG. 7 is a flowchart illustrating operations performed to generate an XML message, according to one embodiment of the invention.

As discussed above, XML files are generated using name-value (element-data) pairs that are inserted into an "empty" XML DOM template. FIG. 7 shows a flowchart illustrating operations performed when generating an XML file, according to one embodiment. The process begins in a block 700, in which an applicable DOM template is retrieved from an XML schema managed by client XML schema application 218. The DOM template will comprise a portion of the XML schema applicable to a selected XML request or reply message, such as XML request 250 and XML reply 252 depicted in FIG. 2. In general, smaller schemas may be stored in a non-persistent store (e.g., a firmware store), while larger schemas will typically be retrieved from a mass storage device and loaded into system memory. In one embodiment, the XML schema may be loaded into memory from a network storage location. In one embodiment, the applicable schema portions are "pushed" to clients by management server 186.

The DOM template defines a DOM tree structure that is used to build a skeletal tree in a block 702. In one embodiment, the skeletal tree mirrors the structure of a selected XML request or reply message, with each message hierarchy element occupying respective DOM branch and sub-branch objects. The reason for the "skeletal" reference is because at this point in time the DOM tree only contains element outlines, with no data elements pertaining to the message objects. In general, the Dom tree data objects will correspond to diagnostic data returned from the applicable disk, as depicted by block 612 in FIG. 6.

The next set of operations in the loop defined by start and end loop blocks 704 and 710 are used to populate the skeletal DOM tree with data (i.e., diagnostic data objects). For each applicable diagnostic object, corresponding data is retrieved in a block 706. For example, if an XML reply message is to contain temperature data corresponding to a <Temp> . . . </Temp> attribute element, corresponding data retrieved from the diagnosed disk is returned. Appropriate DOM tree nodes are then filled with the retrieved data in a block 708. In one embodiment, the operations of blocks 706 and 708 are performed on the fly. In another embodiment, the various data may be temporarily stored in a pre-configured data structure, wherein the DOM tree nodes are filled by retrieving data from the data structure in one operations rather than iteratively as depicted in FIG. 7.

After the DOM tree nodes have been filled, the XML file (also referred to as an XML document or fragment) corresponding to the selected message type and schema structure is generated in a block 712. The XML file is then packaged as a SOAP message and sent as described above with reference to blocks 604 and 616 of FIG. 6.

Figure 8:
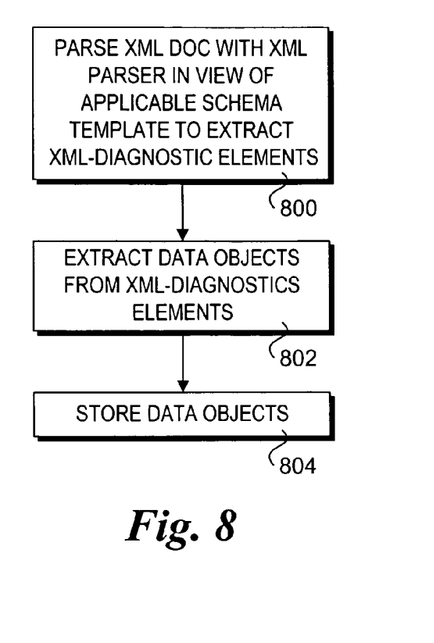
FIG. 8 is a flowchart illustrating operations performed during processing of a received XML message, according to one embodiment of the invention.

FIG. 8 shows a flowchart illustrating operations performed when processing a received XML file, according to one embodiment. Prior to the operations shown, an XML message containing the file will be received via an appropriate transport (e.g., HTTP) and be processed by the applicable network stack and SOAP/HTTP components. As shown by a block 800, the XML file is then parsed with XML parser 216 or 242 (as applicable) to extract the XML data elements. Data objects encapsulated in the extracted elements are then extracted in a block 802 and stored in a block 804. Typically, the data objects will be stored in system memory, but they may be stored on other storage means as well. The data objects can then be examined, manipulated, etc. by firmware or software components or applications (e.g., diagnostics agent 142 and console diagnostic application 228).

In general, disk diagnostics testing and/or retrieval of existing data may be performed via initiation via management console 222, or via initiation by the disk host (e.g., client 100). In one embodiment, a timer tick is used to automate the disk diagnostic activities at a host in accordance with the flowchart of FIG. 9.

Figure 9:
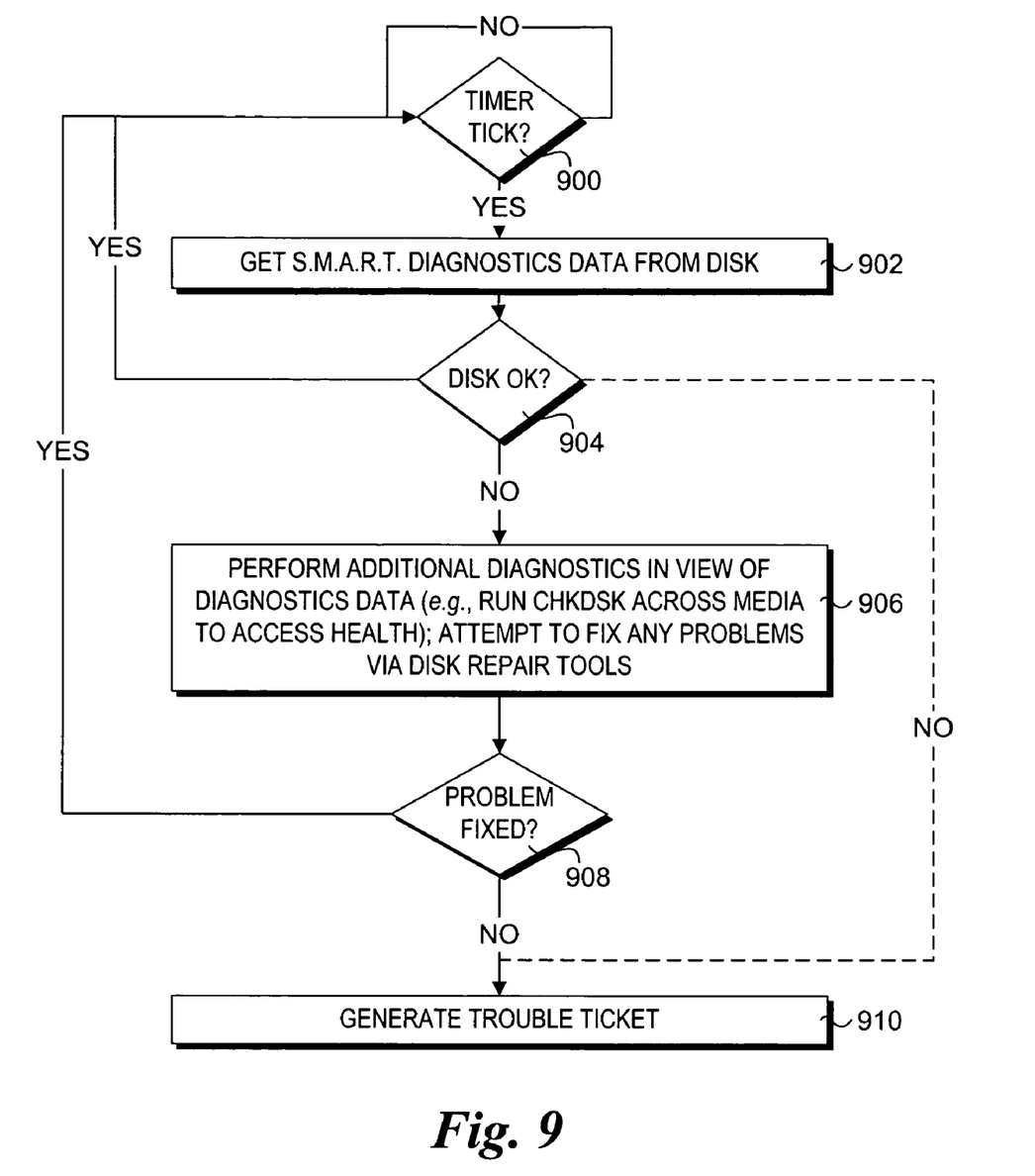
FIG. 9 is a flowchart illustrating operations performed under one embodiment of a disk management scheme that employs the client architecture of FIGS. 1 and 2.

The process begins in response to a timer tick event, as depicted by a decision block 900. In response to a timer tick, the S.M.A.R.T. diagnostics data are retrieved from the disk in a block 902 using functionality provided by LAN microcontroller 112 in the manner described above. In a decision block 904, a determination is made to whether the disk is functioning properly or not. If the diagnostics data indicates the disk is functioning properly, the logic returns to decision block 900 to wait for the next timer tick. In one embodiment, if the diagnostics data indicates the disk is not performing properly, the logic proceeds to a block 910 in which a trouble ticket is generated. In general, a typical trouble ticket should contain information identifying the disk and client, the type of failure, list of diagnostics data, etc.

In another embodiment, if the diagnostics data indicates the disk is not performing properly, the logic proceeds to a block 906 in which additional diagnostics are performed in view of the diagnostics data. For example, the CHKDSK command can be issued via a Microsoft Windows operating system to run a set of disk checks. Similar commands are available for other operating system. Other built-in tests or checks may be employed via the S.M.A.R.T. command set in block 906. Furthermore, attempts to fix the problem may be made via either operating system or built-in disk repair tools. If the problem is fixed, the logic returns to a decision block 900 to wait for the next timer tick. If the problem is not fixed, a trouble ticket is generated in block 910.

FIG. 10 shows details of a hardware architecture corresponding to one embodiment of LAN microcontroller 112. The LAN microcontroller includes a processor 1000, coupled to random access memory (RAM) 1002, and read-only memory (ROM) 1004 via a bus 1006. The LAN microcontroller further includes multiple I/O interfaces, including network interface 146, SPI interface 156, PCIe interface 158 and SMbus interface 160. In one embodiment, a cache 1008 is coupled between processor 1008 and SPI interface 156.

In general, the operations of the various components comprising OOB IP networking stack 144, OOB web server 140, and diagnostic agent 142 may be facilitated via execution of instructions provided by LAN microcontroller firmware 150 (or other firmware store on-board LAN microcontroller 112) on processor 900. Additionally, the operations of SPI interface 156, PCIe interface 158 and SMbus interface 160 may be facilitated via hardware logic and/or execution of instructions provided by LAN microcontroller firmware 150 (or other firmware store on-board LAN microcontroller 112) on processor 900. Furthermore, all or a portion of the firmware instructions may be loaded via a network store using the OOB communications channel. As discussed above, the various management console components may generally be embodied as sets of instructions corresponding to one or more software modules or applications.

Thus, embodiments of this invention may be used as or to support software and/or firmware instructions executed upon some form of processing core (such as the processor of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:

sending a diagnostics request from a management server to a client linked in communication with the management server via a network, the diagnostics request received via an out-of-band (OOB) communication channel for the client that is transparent to an operating system running on the client, wherein the diagnostic request and a reply containing the diagnostic data are sent as an XML-(extended markup language) based messages;

submitting one or more diagnostics commands identified by the diagnostics request to a disk drive identified by the diagnostics request and hosted by the client;

receiving diagnostic data from the disk drive in response to said one or more diagnostic commands;

returning the diagnostic data to the management server via the client OOB communication channel;

packaging the diagnostics request as a first XML file contained in a first Simple Object Access Protocol (SOAP) message;

transporting the first SOAP message over the Hypertext Transport Protocol (HTTP) to the client;

processing the first SOAP message to extract the first XML file; and extracting information identifying the one or more diagnostic commands and the disk drive for which diagnostic data are to be obtained from the first XML file.

2. The method of claim 1, further comprising:

packaging the diagnostics data returned from the disk drive in a second XML file contained in a second SOAP message;

transporting the second SOAP message over HTTP from the client to the management server;

processing the second SOAP message to extract the second XML file; and extracting the diagnostic data from the second XML file.

3. The method of claim 1, further comprising:

parsing an XML request file contained in a diagnostics request message in view of an applicable XML schema template to extract name value pairs corresponding to the diagnostics request from the XML request file.

4. The method of claim 1, further comprising:

receiving disk attributes in response to the one or more disk diagnostics command from the disk drive, each disk attribute comprising a name-value pair including the name of an attribute and a corresponding value for the attribute; and generating an XML file having XML elements containing data corresponding to the disk attributes.

5. The method of claim 4, wherein the operation of generating the XML file comprises:

storing XML template information in an XML schema;

identifying a portion of the XML SIG schema corresponding to an XML file that is to be generated; and generating XML content formatted according to a template defined by the portion of the XML schema that is identified to build the XML file.

6. The method of claim 1, wherein the disk drive comprises an IDE-(integrated drive electronics) based disk drive.

7. The method of claim 1, wherein the disk drive comprises a SCSI-(Small Computer System Interface) based disk drive.

8. The method of claim 1, wherein the one or more diagnostics commands are compliant with the S.M.A.R.T. (Self-Monitoring, Analysis and Reporting Technology) system.

9. The method of claim 1, wherein the operations performed at the client are facilitated by an embedded LAN microcontroller at the client.

10. The method of claim 1, further comprising:
generating a user interface via which the disk diagnostics data may be viewed.

11. The method of claim 10, wherein the user interface is a browser-based user interface.

12. A method, comprising:
submitting at least one diagnostics command to a disk drive hosted by a client, the at least one diagnostics command being submitted by a diagnostics agent that is transparent to an operating system running on the client;
receiving diagnostic data from the disk drive in response to said at least one diagnostics command;
sending the diagnostic data to a management server linked in communication with the client via a network, the diagnostic data sent via an out-of-band (OOB) communication channel for the client that is transparent to the operating system running on the client;
generating an XML file containing the diagnostics data received from the disk drive;
packaging the XML file in a Simple Object Access Protocol (SOAP) message; and
transporting the SOAP message over the Hypertext Transport Protocol (HTTP) from the client to the management server.

13. The method of claim 12, further comprising:
receiving disk attributes from the disk drive in response to said at least one diagnostics command, each disk attribute comprising a name-value pair including the name of an attribute and a corresponding value for the attribute; and
generating an XML file having XML elements containing data corresponding to the disk attributes.

14. The method of claim 13, wherein the operation of generating the XML file comprises:
storing XML template information in an XML schema;
identifying a portion of the XML schema corresponding to an XML file that is to be generated; and
generating XML content formatted according to a template defined by the portion of the XML schema that is identified to build the XML file.

15. The method of claim 12, wherein the disk drive comprises one of an IDE-(integrated drive electronics) based disk drive and a SCSI-(Small Computer System Interface) based disk drive.

16. The method of claim 12, further comprising:
submitting a first diagnostics command to retrieve a first set of diagnostics data;
receiving the first set of diagnostics data from the disk drive; and
performing additional diagnostic operations in view of the first set of diagnostics data.

17. The method of claim 12, further comprising:
determining a disk problem in view of the diagnostics data; and
employing a disk repair tool to fix the disk problem.

18. A machine-readable storage medium to provide instructions, which if executed on an embedded controller on a client performs operations comprising:
submitting at least one diagnostics command to a disk drive hosted by a client;
receiving diagnostic data from the disk drive in response to said at least one diagnostics command;
inserting the diagnostic data in one or more network packets;
sending one or more network packets to a management server linked in communication with the client via a network, the diagnostic data sent via an out-of-band (OOB) communication channel for the client that is transparent to the operating system running on the client;
receiving disk attributes from the disk drive in response to said at least one diagnostics command, each disk attribute comprising a name-value pair including the name of an attribute and a corresponding value for the attribute;
generating an XML file having XML elements containing data corresponding to the disk attributes;
packaging the XML file in a Simple Object Access Protocol (SOAP) message; and
transporting the SOAP message over the Hypertext Transport Protocol (HTTP) from the client to the management server.

19. The machine-readable storage medium of claim 18, wherein the operation of generating the XML file comprises:
storing XML template information in an XML schema;
identifying a portion of the XML schema corresponding to an XML file that is to be generated; and
generating XML content formatted according to a template defined by the portion of the XML schema that is identified to build the XML file.

20. The machine-readable storage medium of claim 18, wherein the instructions comprise firmware instructions.

21. A computer system, comprising:
a platform processor;
a input/output controller hub (ICH), operatively coupled to the platform processor;
a disk drive controller, operatively coupled to or built into the ICH;
an local area network (LAN) microcontroller, operatively coupled to the ICH, the LAN microcontroller including an embedded processor and a network interface; and
a storage device, coupled to the LAN microcontroller and having instructions stored therein, which if executed by the embedded processor perform operations comprising:
submitting at least one diagnostics command to a disk drive coupled to the disk drive controller;
receiving diagnostic data from the disk drive in response to said at least one diagnostics command;
inserting the diagnostic data into one or more network packets;
sending the one or more network packets to a management server linked in communication with the computer system via the network interface, the diagnostic data sent via an out-of-band (OOB) communication channel that is transparent to an operating system to be run on the platform processor;

receiving disk attributes from the disk drive in response to said at least one diagnostics command, each disk attribute comprising a name-value pair including the name of an attribute and a corresponding value for the attribute;

generating an XML file having XML elements containing data corresponding to the disk attributes packaging the XML file in a Simple Object Access Protocol (SOAP) message; and transporting the SOAP message over the Hypertext Transport Protocol (HTTP) from the client to the management server.

22. The computer system of claim 21, wherein the disk drive comprises an integrated drive electronics (IDE) disk drive, and the at least one diagnostics command is compliant with S.M.A.R.T. (Self-Monitoring, Analysis and Reporting Technology) system commands supported by the IDE disk drive.

23. The computer system of claim 21, wherein the disk drive comprises a Small Computer System Interface (SCSI) disk drive, and the at least one diagnostics command is compliant with S.M.A.R.T. (Self-Monitoring, Analysis and Reporting Technology) system commands supported by the SCSI disk drive.

* * * * *